US008777557B2

(12) United States Patent
Zhang et al.

(10) Patent No.: US 8,777,557 B2
(45) Date of Patent: Jul. 15, 2014

(54) COMPOUND ROTOR SYSTEM OF WIND ENERGY CONVERSION SYSTEM (WECS) AND WECS

(75) Inventors: Yunlong Zhang, Shanghai (CN); Hongying Zhang, Shanghai (CN)

(73) Assignees: Shanghai Forevoo Windpower Technology Co., Ltd., Pudong New District, Shanghai (CN); Shanghai Powerfood Energy System Co., Ltd., Pudong New District, Shanghai (CN); Yunlong Zhang

( * ) Notice: Subject to any disclaimer, the term of this patent is extended or adjusted under 35 U.S.C. 154(b) by 509 days.

(21) Appl. No.: 13/062,391

(22) PCT Filed: Sep. 3, 2009

(86) PCT No.: PCT/CN2009/000997
§ 371 (c)(1),
(2), (4) Date: Mar. 4, 2011

(87) PCT Pub. No.: WO2010/025622
PCT Pub. Date: Mar. 11, 2010

(65) Prior Publication Data
US 2011/0163552 A1    Jul. 7, 2011

(30) Foreign Application Priority Data

Sep. 5, 2008  (CN) .......................... 2008 1 0146600

(51) Int. Cl.
*F03D 7/02* (2006.01)
(52) U.S. Cl.
USPC ............. 415/4.3; 415/4.5; 415/123; 415/908; 416/201 R

(58) Field of Classification Search
USPC ............ 415/4.1, 4.3, 4.5, 123, 143, 905, 908; 416/169 R, 170 R, 175, 198 R, 201 R, 416/201 A, 203
See application file for complete search history.

(56) References Cited

U.S. PATENT DOCUMENTS

| 3,891,347 | A | * | 6/1975 | Jacobs et al. .................... 416/32 |
| 4,150,301 | A |  | 4/1979 | Bergey, Jr. |
| 5,876,181 | A | * | 3/1999 | Shin ............................... 415/2.1 |
| 6,705,838 | B1 | * | 3/2004 | Bak et al. ...................... 416/243 |
| 6,856,042 | B1 | * | 2/2005 | Kubota .......................... 290/55 |

(Continued)

FOREIGN PATENT DOCUMENTS

| CN | 201301778 A | 6/2007 |
| CN | 101004168 A | 7/2007 |

(Continued)

*Primary Examiner* — Edward Look
*Assistant Examiner* — Danielle M Christensen
(74) *Attorney, Agent, or Firm* — Lau & Associates, LLC.

(57) ABSTRACT

The present invention provides a controllable compound rotor system for the WECS, with a pilot rotor working under low wind speed conditions and a main rotor working under high speed conditions. By proper switching of the clutch, the WECS can not only achieve a greater starting torque under low wind speed conditions, as well as to capture and utilize the low wind-speed wind energy after being started, but also give full play to the advantage of the main rotor having the excellent wind capturing efficiency under high wind speed and high turning speed conditions. Thus the WECS can capture and utilize wind energy under both low and high wind speed conditions, which greatly expands the speed and zone range wherein the WECS can be applied, facilitating wide application of the WECS.

19 Claims, 6 Drawing Sheets

(56) References Cited

U.S. PATENT DOCUMENTS

| | | | |
|---|---|---|---|
| 6,945,747 B1 * | 9/2005 | Miller | 415/4.3 |
| 7,044,713 B2 * | 5/2006 | Joo | 416/201 A |
| 7,047,011 B1 * | 5/2006 | Wikman | 455/442 |
| 2002/0192070 A1 * | 12/2002 | Selsam | 415/4.3 |
| 2004/0096327 A1 * | 5/2004 | Appa et al. | 416/1 |

FOREIGN PATENT DOCUMENTS

| | | |
|---|---|---|
| CN | 1976178 A | 6/2009 |
| CN | 101457736 A | 6/2009 |
| GB | WO2007/017629 | 2/2007 |
| JP | 63-29064 A | 2/1988 |
| WO | WO 2007045940 A1 * | 4/2007 |

* cited by examiner

COMPOUND ROTOR SYSTEM OF WIND ENERGY CONVERSION SYSTEM (WECS) AND WECS

FIELD OF THE INVENTION

The present invention relates to a rotor system of wind energy conversion system (hereinafter "WECS"), and particularly to a controllable compound birotor system.

BACKGROUND OF THE INVENTION

A serious problem with the WECS technology is its wind-energy capturing inefficiency under low wind speed conditions, which limits application scope of the WECS. Since the low-speed wind energy cannot be captured under low wind speed conditions due to the low starting torque, a wind speed of 3-4 m/s is generally regarded as a bottleneck for a horizontal-axis-rotor WECS.

The wind energy below this wind speed cannot be captured effectively to generate the ideal rotating torque for driving a generator, etc., and is thus generally abandoned.

However, in the area easy to be developed, the ratio of the land with the wind speed lower than 4 m/s to the total land is no less than 85% according to statistics, which means that a common WECS is useless in most lands. Therefore, how to capture the wind energy effectively under low wind speed conditions is a common technical problem in the WECS industry.

Explanation will be made below with reference to relevant backgrounds of knowledge and technology. Some terms as well as relevant knowledge and principles are mentioned in many places of the present specification, such as "airfoil", "lift", "drag", "ratio of lift coefficient to drag coefficient", "angle of attack", "turning speed", "tip-speed ratio", "relationship between tip-speed ratio and wind-energy conversion efficiency", and "wind-energy capturing efficiency". These knowledge and principles are well known to those skilled in the fields of aerodynamics and wind power generation, and will thus not be described here in detail. Typical related references include *Wind Engineering and Industrial Aerodynamics* (compiled by He Dexin, et al, National Defense Industry Press, 1st edition in January 2006), and *Wind Energy Handbook* (written by Tony Burton, et al, Science and Industry Press, 1st edition in September 2007).

It is known according to general aerodynamic principles about airfoil and lift that for a blade with a given airfoil under given wind speed conditions, the ratio of lift coefficient to drag coefficient and the torque of the blade can be changed synchronizingly by changing the angle of attack of the blade, while the ratio of lift coefficient to drag coefficient and the blade torque are also related to the turning speed of the blade.

When the blade keeps a big angle of attack, it will generate a relatively big rotating torque under low wind speed or low turning speed conditions. Besides, since the drag is in direct proportion to square of the speed, a very big drag torque will be generated under high wind speed or high turning speed conditions, and actually become a damping preventing the rotor from rotating.

When the blade keeps a small angle of attack, it will generate a very big lift torque and a smaller drag torque under high wind speed and high turning speed conditions. However, it can only generate a very small rotating torque under low wind speed conditions, which is limited for staring the rotor.

In summary, it is difficult for a single rotor to both get started easily under low wind speed conditions and possess high efficiency under high turning speed conditions.

Some experiments were made as below: Connecting a high-speed rotor in series with a low-speed rotor, and installing them on a main shaft rigidly, so as to make them be started easily under low wind speed conditions and possess high efficiency under high speed conditions as well. However, this approach proved to be feasible neither theoretically nor practically due to the following reasons: Some measures will naturally be taken in order to get started easily under low wind speed conditions, such as increasing the angle of attack, number of the blades, and the up-wind area; these measures will on one hand surely increase the starting torque, however, on the other hand, the aerodynamic drag produced by the rotor will also increase with accelerated rotation of the rotor; this will not only limit the speed itself, but more importantly impair the turning speed of the main rotor as well, which will thus lower the capturing efficiency under high wind speed and high turning speed conditions, even being not worth the candle. Therefore, it is impractical to superpose the two rotors rigidly in an integrated layout.

The Chinese utility model patent application with publication number No. CN2802116Y has the following design concept: A frame-type multistage WECS for wind power generation is provided; the rotor set is composed of frame-type multistage rotors of different diameters installed coaxially in sequence, with each of the rotors connected with a gear box; the rotation of each of the rotors round the horizontal axis can be converted into the rotation round the vertical axis via a vertical shaft in this gear box, and then transmitted to bottom of a support located on a bearing rotating frame, which is located via a rotary device on a circular stabilizing frame connected with the foundation; a main bearing frame of the bearing rotating frame is provided at one end with a generator, whose shaft is connected with a horizontal shaft pointing to the center of the bearing rotating frame, with the horizontal shaft connected with a downward vertical shaft in the gear box via a pair of tapered gears. This invention, intending to use the wind energy by means of the multistage multiple rotors, has a key disadvantage that it does not operate each of the rotors in a separate controllable mode, because the rotors are different in such properties as power, turning speed and torque. Actually, this invention connects all the rotors mechanically in a closed system and transmits them simultaneously to one main shaft. Therefore, the actual working situation will be as below: The rotor supposed to rotate at a high speed cannot rotate at the supposed high speed due to the low-speed rotor, and cannot therefore output the optimal power; the rotor supposed to rotate at a low speed is driven to rotate at a high speed due to being driven by other rotors, and generates an excessive aerodynamic damping, thus not being able to output the ideal power. In summary, the rotors negatively affect each other, which will prevent the wind energy from being utilized effectively; in addition, the bulky and complicated structure will impair economy, reliability and applicability of this invention. The Chinese Invention patent application with publication No. CN101004168A, with the same inventor as the above-mentioned patent publication No. CN2802116Y, is disclosed mainly for optimizing transmission in the disclosed patent application No. CN2802116Y, however not overcoming other shortcomings mentioned in the present specification.

In summary, all the various disclosed technical approaches cannot attain the purpose of utilizing the wind energy efficiently with one WECS not only under low speed conditions but also under high speed conditions.

CONTENTS OF THE INVENTION

In order to overcome the shortcomings of the prior technology, a purpose of the present invention is to provide a controllable compound rotor system of WECS and a WECS that can provide an ideal starting torque under low wind speed and low turning speed conditions, with the main rotor continuing to work under high wind speed and high turning speed conditions as well as the pilot rotor being detached without obstructing the main rotor. Thus the present invention can obtain a big torque under low speed conditions, and prevent the aerodynamic drag torque from obstructing under high speed conditions, thereby expanding the wind energy application scope and improving the wind-energy capturing efficiency.

In order to attain the above-mentioned purpose, a technical solution of the present invention is as below: Two independent rotor units are installed in series on the main shaft, with at least one of the two rotor units connected with the main shaft non-rigidly but via a clutch, so that a controllable rotating detachable transmission relationship is formed between the two rotors as well as between the rotors and the main shaft. The details are as below: The two rotor units, one being the main rotor unit and the other the pilot rotor unit, have their own functions:

1. The "main rotor" unit is composed of blades with an angle of attack smaller than 18 degrees. It has high rotating torque and wind-energy capturing efficiency under high tip-speed ratio conditions with the tip-speed ratio bigger than 2 (i.e. under high wind speed or high turning speed conditions), generating a big rotating torque. It can only generate a small rotating torque when the tip-speed ratio is smaller than the above value (i.e. under low wind speed or low turning speed conditions).

2. The "pilot rotor" is a low-speed rotor, and composed of at least 4 blades. It will generate a big rotating torque under low tip-speed ratio conditions with the tip-speed ratio smaller than 2 (i.e. under low wind speed or low turning speed conditions).

It is obvious that the pilot rotor is used for capturing the low wind-speed wind energy that is difficult to capture by the main rotor, so as to provide the main rotating torque for driving the rotor to be started directly. While under high tip-speed ratio conditions (i.e. the high tip-speed ratio is bigger than 2), the main rotor will take all the duty of capturing the wind energy and drive the main shaft to rotate.

The clutch device is preferably an overrunning clutch, which can be installed in the following two ways:

One is to install one clutch between the pilot rotor and the main shaft and between the main rotor and the main shaft, respectively; and the other is to install the clutch between the pilot rotor and the main rotor. With the main rotor unit and the pilot rotor unit installed on the main shaft in these ways as well as the clutch between them, a controllable rotating detachable transmission relationship is formed between the two rotor units and between the rotor units and the main shaft. The logical relationship in the system is as below:

1. When the angular turning speed of the pilot rotor unit is bigger than that of the main rotor unit, the clutch is engaged, and here the pilot rotor will drive the main shaft.

2. When the angular turning speed of the pilot rotor unit is equal to that of the main rotor unit, the clutch is in a critical state between being engaged and disengaged, that is, both the pilot rotor and the main rotor will drive the main shaft.

3. When the angular turning speed of the pilot rotor unit is smaller than that of the main rotor unit, the clutch is disengaged, that is, the main rotor instead of the pilot rotor will drive the main shaft.

A technical solution of the WECS of the present invention is to use the above-mentioned compound rotor system of WECS in the WECS.

The present invention has the following advantages:

With a pilot rotor working under low speed conditions and a main rotor working under high speed conditions, by proper switching of the clutch, the WECS can not only achieve a greater starting torque under low wind speed conditions, but utilize the low wind-speed wind energy after being started as well; besides, giving full play to the advantage of the main rotor having the excellent wind capturing efficiency under high wind speed conditions, the WECS can capture and utilize wind energy under both low and high wind speed conditions, which greatly expands the speed and zone range wherein the WECS can be applied, facilitating wide application of the WECS.

BRIEF DESCRIPTION OF THE DRAWINGS

The present invention will further be described below with reference to drawings and examples.

List of reference numbers: 1. Blade of pilot rotor; 2. blade of main rotor; 3. main shaft; 4. main-rotor clutch; 5. pilot-rotor clutch (5a. driving port of clutch; and 5b. driven port of clutch); 6. ratchet claw; 7. connection key; and 12. bare generator.

DETAILED DESCRIPTION OF THE EMBODIMENTS

Figure 1:
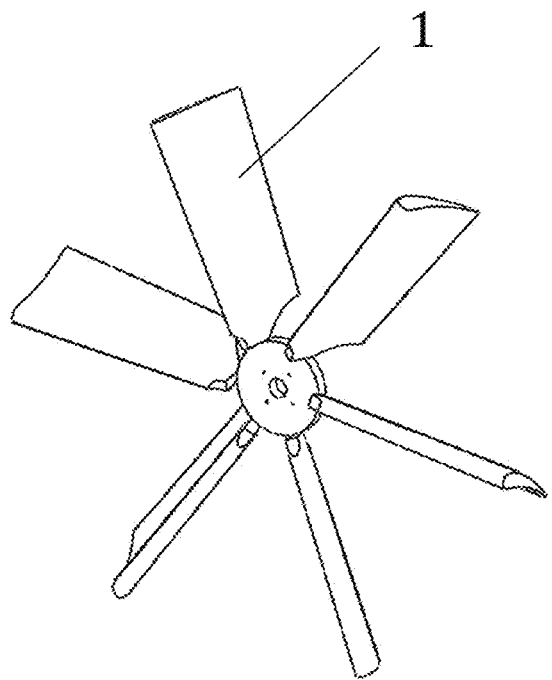
FIG. 1 is an outline structural schematic drawing of a preferred example of the pilot rotor unit according to the present invention.

FIG. 1 shows a preferred example of a pilot rotor unit composed of 6 pieces of blades. The pilot rotor unit is obviously big in number and area of the blades as well as in the angle of attack, and thus generally high in the wind capturing capability. It can capture the wind energy easily under low wind speed conditions. However, after reaching a certain turning speed, it will suffer the greatly increased aerodynamic drag, with the wind energy utilization efficiency greatly lowered. This feature is well known to those skilled in the fields of aerodynamics and wind energy technology, and will not be described here any more.

Figure 2:
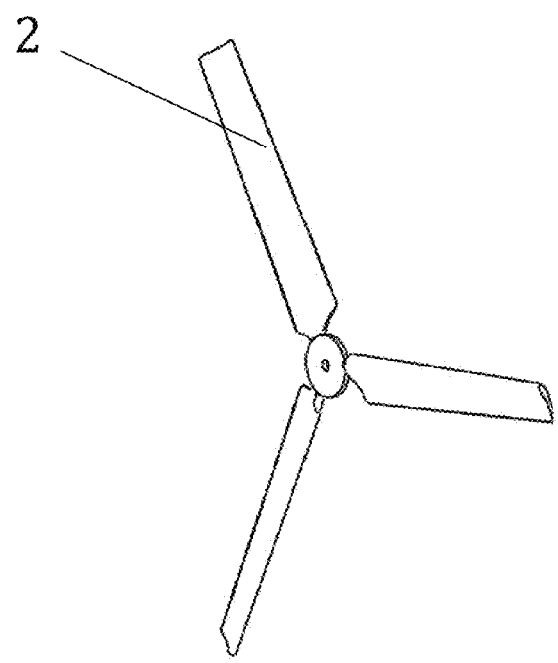
FIG. 2 is an outline structural schematic drawing of a preferred example of the main rotor unit according to the present invention.

FIG. 2 shows a preferred example of a main rotor unit composed of 3 pieces of blades. Compared with the pilot rotor unit, the main rotor unit is obviously smaller in number and area of the blades as well as in the angle of attack, and thus lower in the wind capturing capability under low wind speed conditions. However, once reaching a certain start-up speed, it will possess outstanding wind capturing capability and wind-energy utilization efficiency under high wind speed and high turning speed conditions. These features are well known to those skilled in the fields of aerodynamics and wind energy technology, and will not be described here any more.

Figure 3:
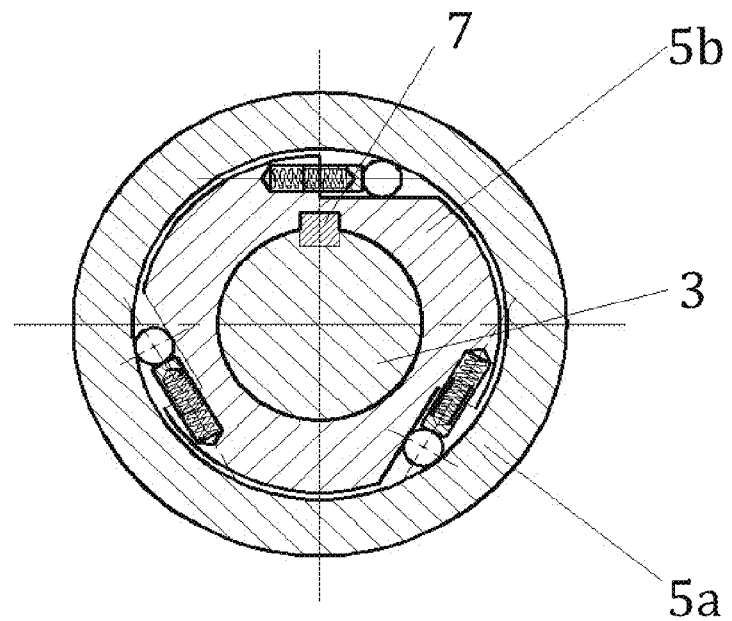
FIG. 3 is a structural sectional schematic diagram of the friction-type overrunning clutch according to the present invention.

FIG. 3 is a sectional schematic drawing of a friction-type overrunning clutch.

The structural principle of the overrunning clutch is well known to those skilled in the mechanical engineering technology, and will not be described here any more.

Authoritative technical references with detailed information include *Mechanical Design Handbook* (China Machine Press, new edition, Chapter 10 "Overrunning Clutch" of Part 22 "Coupling, Clutch and Brake" of Volume 3 "Design of Mechanical Parts and Transmission").

Figure 4:
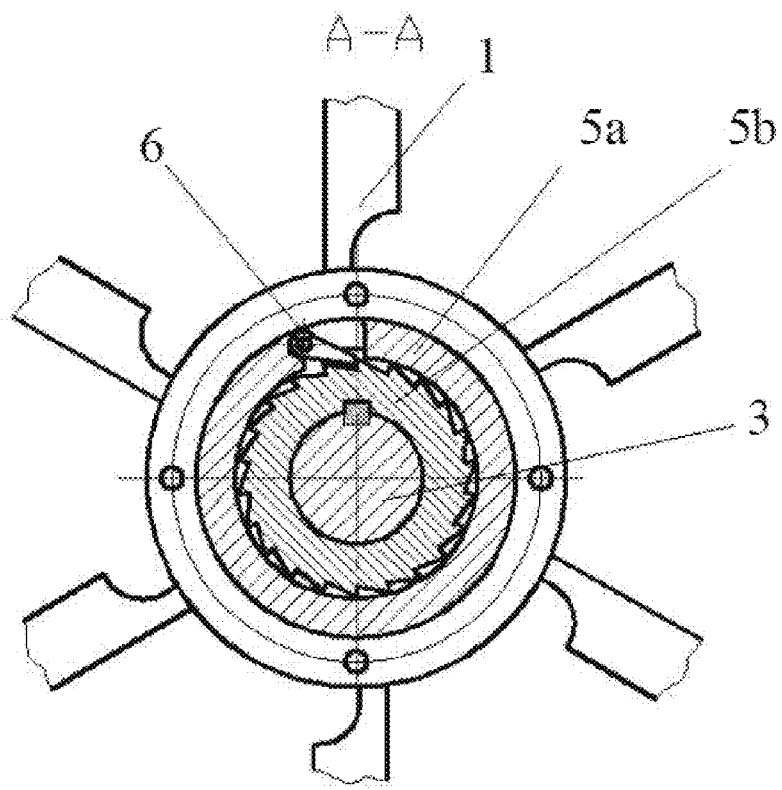
FIG. 4 is a structural sectional schematic diagram of the ratchet-type overrunning clutch according to the present invention.

FIG. 4 is a sectional schematic drawing of a ratchet-type overrunning clutch.

Figure 5:
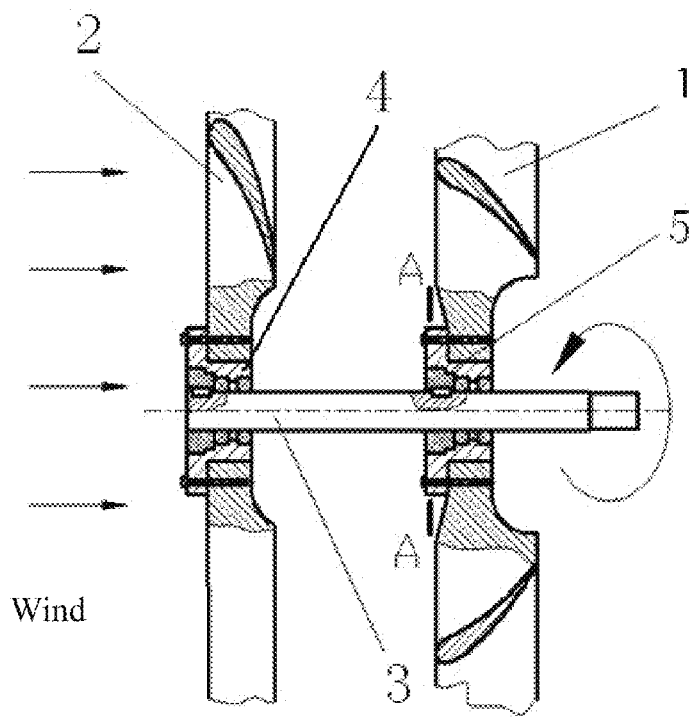
FIG. 5 is a sectional schematic drawing of a system assembly where one clutch is installed between the main shaft and each of the main rotor and the pilot rotor according to the present invention.

FIG. 5 is a schematic drawing of an assembly where one clutch is installed between the main shaft and each of the main rotor and the pilot rotor. The two rotor units are connected with the main shaft via the two clutch devices, respectively, such that the two rotor units constitute two controllable rotating detachable transmission chains with the main shaft, respectively.

That is, Pilot rotor-pilot-rotor clutch-main shaft;

and main rotor-main-rotor clutch-main shaft.

In the two transmission chains, it is obvious for the main rotor unit and the pilot rotor unit that only the rotor unit that is earlier to be started or higher in the angular turning speed can put its own clutch into the state of load-bearing engagement, and drive the main shaft to rotate via the clutch; while the rotor unit that is later to be started or lower in the turning speed will put its own clutch naturally into the state of no-load disengagement, and be exceeded, unable to drive the main shaft.

Since the pilot rotor is advantageous over the main rotor in the capability of capturing low-speed wind energy, it is obvious that the pilot rotor needs to be started earlier, so as to drive the rotor to rotate against drag torque and moment of inertia of the load and to apply work. Besides, with the pilot rotor affected by drag and moment of inertia of the load, the load on the rotating main rotor will be very small, and then the lift generated by the external wind will easily drive it to rotate. The faster it rotates, the faster it will capture and absorb the wind energy from outside, which will make it rotate even faster. With this process thus repeated, the pilot rotor will be exceeded in the angular speed by the main rotor, and thus lose the driving effect on the main shaft, with only the main rotor driving the main shaft. If the wind speed decreases to such a low range that the main rotor loses sufficient lift torque, the main rotor will slow down or even stop under drag of the load. Then the pilot-rotor clutch will be in the state of load-bearing engagement, and the main rotor exceeded, with the load of the rotating main shaft onloaded to the pilot rotor again . . . . The process will thus be repeated with the switch done constantly. Therefore, the WECS will produce such a positive effect: It can not only capture and utilize the low-speed wind energy easily, but also capture the high-speed wind energy efficiently, which greatly expands the utilization range of the WECS, with the utilization value highly increased.

Figure 6:
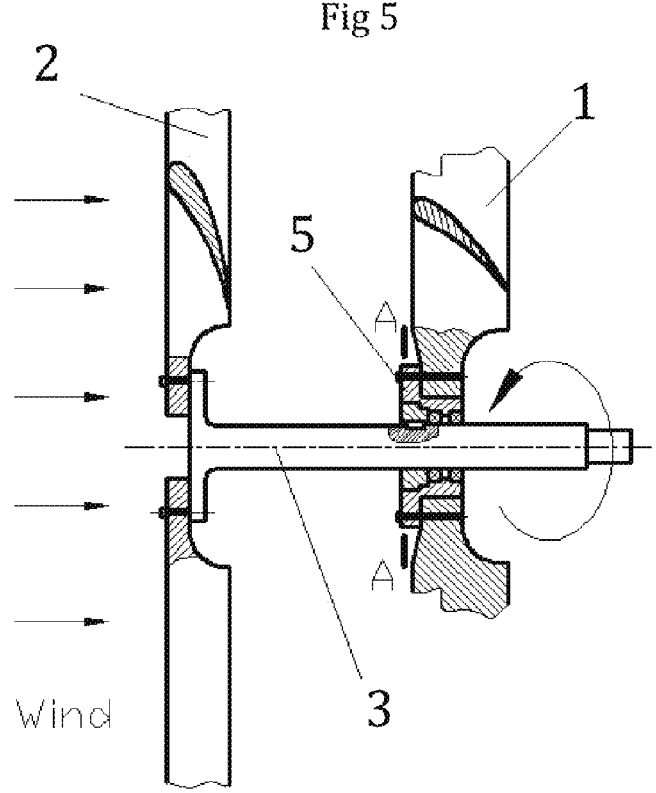
FIG. 6 is a sectional schematic drawing of an assembly where the clutch is only installed between the pilot rotor and the main shaft.

FIG. 6 is a sectional schematic drawing of the assembly according to the present invention where the clutch is only installed between the pilot rotor and the main shaft.

In this example, the driving port and the driven port of the overrunning clutch are connected rigidly with the main shaft, and the main rotor is connected rigidly with the main shaft (it is different from the former in that the main rotor is connected with the pilot rotor via the main shaft indirectly and rigidly without a overrunning clutch between them), so that a controllable rotating detachable transmission relationship is formed between the pilot rotor unit and the main shaft. That is, pilot rotor-clutch device-(main rotor+main shaft). When the pilot rotor captures the wind energy and gets started first, it will not drive the main shaft separately and directly, but drive the main rotor at the same time, so that the main shaft will be driven only after the main rotor is started. The torque is transmitted via the overrunning clutch in the state of load-bearing engagement to drive the main rotor to rotate. Thus the main rotor can also absorb more wind energy by rotating, and generate a greater lift to form an effective torque, which will drive the rotor to rotate against drag torque and moment of inertia of the load and to apply work. Besides, with the pilot rotor affected by drag and moment of inertia of the load, the load on the rotating main rotor will be very small, and then the lift generated by the external wind will easily drive it to rotate. The faster it rotates, the faster it will capture and absorb the wind energy from outside, which will make it rotate even faster.

With the effect intensified, the pilot rotor will be exceeded in the angular speed by the main rotor. If the wind speed rises to a certain level, the main rotor will rotate faster.

After the turning speed of the main rotor is higher than that of the pilot rotor, the clutch will switch to the state of no-load disengagement automatically, with the pilot rotor exceeded and then unable to drive the main shaft. This process is the same with that mentioned above. If the wind speed decreases to such a low range that the main rotor loses sufficient lift torque, the main rotor will slow down or even stop under drag of the load. Then the pilot-rotor clutch will be in the state of load-bearing engagement, and the main rotor exceeded, with the load of the main shaft rotating onloaded to the pilot rotor again . . . . This process is thus repeated. Therefore, the rotor system is always characterized in that it can be started under low wind speed conditions, and possess low drag and high efficiency under high turning speed conditions.

Figure 7:
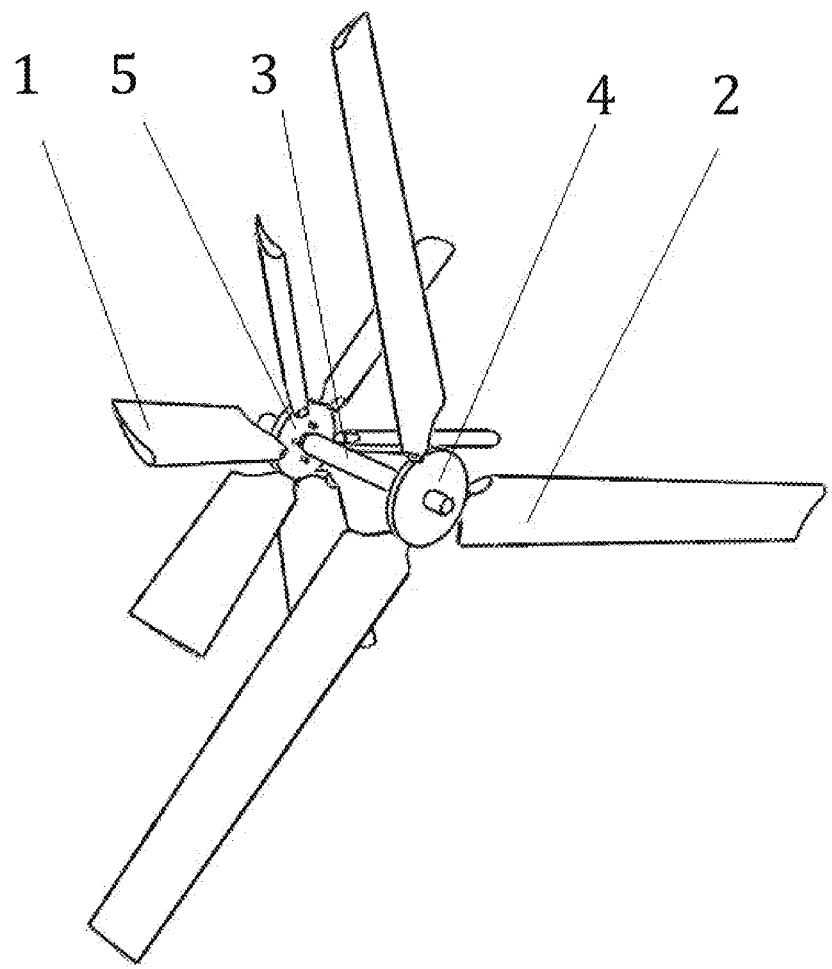
FIG. 7 is an outline structural drawing of an example of an integrated rotor system composed of the pilot rotor and the main rotor.

FIG. 7 is an outline structural drawing of a complete rotor system composed of the pilot rotor and the main rotor. This example proves by the experiments that a configuration with the main rotor installed in the front to receive wind first is advantageous for efficient capturing wind energy. It is easy to be supported theoretically: When the main rotor remains still and the pilot rotor rotates, the incoming-wind disturbance produced by the main rotor can be ignored, and the wind capturing effect of the pilot rotor is barely affected. After the main rotor rotates at a high speed, it will absorb most of the wind energy, with only a little wind energy missed. Here, however, the pilot rotor has surely been exceeded to lose its effect, and therefore this part of wind energy will have no effect even though it cannot be absorbed.

Contrarily, if the pilot rotor is installed in the front and the main rotor at the rear, the main rotor will always be disturbed.

The main rotor can thus only absorb the missed energy, with its inordinate flow field divergent centrifugally beyond the diameter range of the pilot rotor, which will greatly reduce the wind energy obtained by the main rotor under high speed conditions. Therefore, the sequence cannot be reversed.

In addition, it is testified by a great number of experiments that a WECS that cannot be started originally at a wind speed less than 3.5 m/s can be started with the technology of the present invention even when the wind speed is decreased to 1.6-1.8 m/s. Furthermore, since the angle of attack of the blade of the main rotor can be preset to the optimal angle under high wind speed and high turning speed conditions, the performance under high speed conditions is more ideal, with the efficiency increased by more than about 19%.

Figure 8:
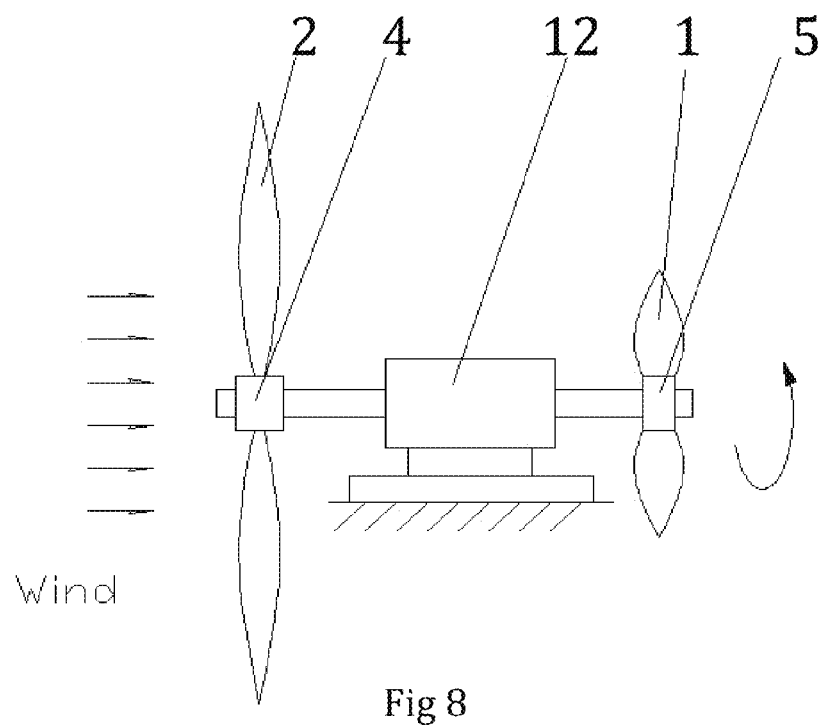
FIG. 8 is a schematic drawing of an example where the main rotor and the pilot rotor of the present invention are installed at both ends of the main shaft of the generator, respectively.

FIG. 8 shows the rotor system of the present invention where the main shaft runs through the generator directly, such that the main rotor unit and the pilot rotor unit are located at both sides of the generator, respectively. This structure is essentially still a special example of the present invention. It is advantageous in that the rotors are located at both ends, and can thus be easily balanced with an improved mechanical structure; besides, the spacing between the two rotors is big enough to prevent the flow fields between them from being disturbed, which will thus reduce the effect of vortex.

Figure 9:
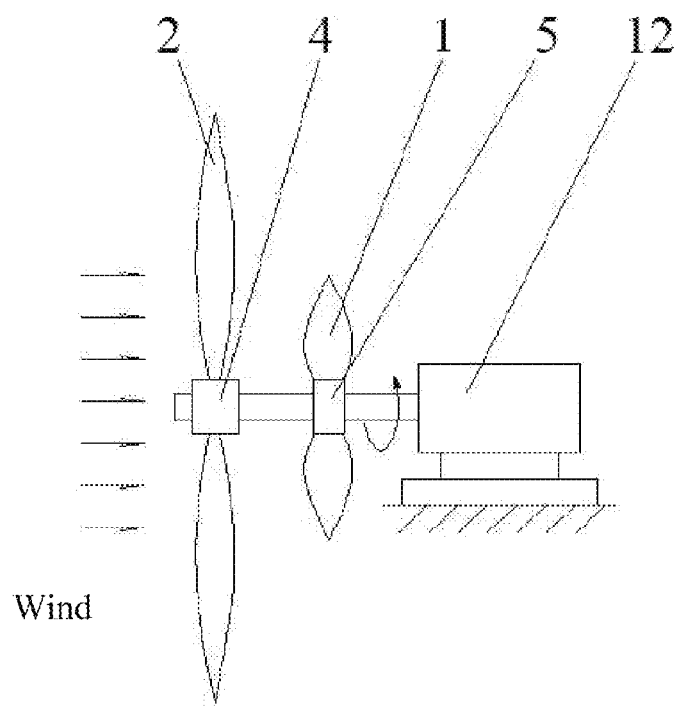
FIGS. 9 and 10 are schematic diagrams of an example where all the rotor systems of the present invention are installed at one and the same end of the generator.
Figure 10:
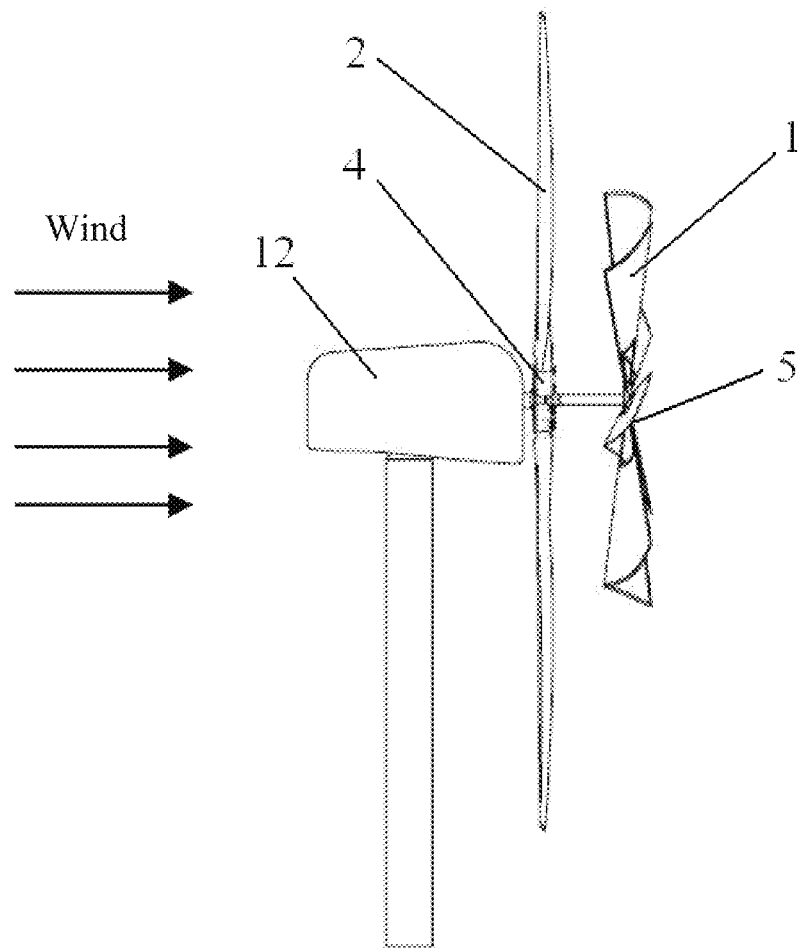

As shown in FIGS. 9 and 10, the main rotor and the pilot rotor can also be located at one and the same end of the generator. As shown in FIG. 9, the main rotor and the pilot rotor are located at the up-wind part of the generator, which can improve the efficiency of absorbing the wind energy. As shown in FIG. 10, the main rotor and the pilot rotor are located at the down-wind part of the generator, which will make the entire WECS adjust the direction directly depending on the main rotor and the pilot rotor, thus allowing abandon of the original tail vane. The example is especially practical for a small WECS.

In addition, the main shaft of the present invention is not necessary to be a rigid integral. It can be an assembly of multiple shafts, which are connected with each other via a coupling, etc. This embodiment is also a special example within the scope of overall concept of the present invention, and will not be in conflict with the inventiveness of the present invention.

The main rotor and/or the pilot rotor can be connected with the main shaft via a deceleration mechanism, which can increase the torsion especially for the pilot rotor that needs to start the generator in the static state and thus requires a greater torsion.

With the deceleration mechanism, the blade of the rotor can also be shorter on the premise of enough torsion. The deceleration mechanism includes but is not limited to a mechanical reducer, a hydraulic reducer or an electromagnetic reducer.

The present invention further provides a WECS that adopts the above-mentioned compound rotor system of WECS.

It can be shown from the above examples that the present invention not only enables the WECS to achieve a greater starting torque under low wind speed conditions as well as to capture and utilize the low wind-speed wind energy after being started, but also gives full play to the advantage of the main rotor having the excellent wind capturing efficiency under high wind speed and high turning speed conditions. Thus the WECS can capture and utilize wind energy under both low and high wind speed conditions, which greatly expands the speed and zone range wherein the WECS can be applied, facilitating wide application of the WECS.

Although the present specification has made a detailed description and provided some specific examples, it is obvious that those skilled in the art can make various changes or amendments, so long as the changes or amendments are within the scope of the inventor's design concept.

Industrial Applicability

The present invention provides a controllable compound birotor system for the WECS. It uses both a pilot rotor working under low wind speed conditions and a main rotor working under high speed conditions. By proper switching of the overrunning clutch, the WECS can not only achieve a greater starting torque under low wind speed conditions as well as capture and utilize the low wind-speed wind energy after being started, but also give full play to the advantage of the main rotor having the excellent wind capturing efficiency under high wind speed and high turning speed conditions. Thus the WECS can capture and utilize wind energy under both low and high wind speed conditions, which greatly expands the speed and zone range wherein the WECS can be applied, facilitating wide application of the WECS.

What is claimed is:

1. A compound rotor system of a wind energy conversion system (WECS), comprising:
   two rotor units with multiple blades;
   a main shaft of a generator for installing the rotor unit;
   wherein the compound rotor system includes two independent clutch devices and two rotor units serving as a pilot rotor unit and a main rotor unit; and the two rotor units are connected with the main shaft of the generator via the two clutch devices respectively, so that the two rotor units constitute two controllable rotating detachable transmission chains with the main shaft of the generator, respectively, with a mounting order from the pilot rotor to the pilot-rotor clutch to the main shaft;
   and from the main rotor unit to the main-rotor clutch to the main shaft, wherein the pilot rotor unit and the main rotor unit are concentrically connected to the main shaft of the generator and wherein the number of blades on a pilot rotor unit is greater than the number of blades on a main rotor unit.

2. The compound rotor system of WECS according to claim 1, wherein the clutch devices are an overrunning clutch, which has two operational modes of load-bearing engagement and no-load disengagement.

3. The compound rotor system of WECS according to claim 1, wherein the controllable rotating detachable transmission relationship formed between the two rotor units and the main shaft via the two clutches has the following relations:
   Relation 1: when angular rotating velocity of the pilot rotor unit is bigger than that of the main rotor unit, the pilot-rotor clutch will be in the state of load-bearing engagement, and the main-rotor clutch in the state of no-load disengagement, that is, here only the pilot rotor outputs the torque to the main shaft, and the main rotor exceeded by the pilot rotor loses the driving effect on the main shaft;
   Relation 2: when the angular rotating velocity of the pilot rotor unit is equal to that of the main rotor unit, the two clutches are both in the critical state of either an engaged state or disengaged state with the main shaft, that is, the pilot rotor and the main rotor drive the main shaft together;
   Relation 3: when the angular rotating velocity of the pilot rotor unit is smaller than that of the main rotor unit, the pilot-rotor clutch will be in the state of no-load disengagement, and the main-rotor clutch in the state of load-bearing engagement, that is, here only the main rotor outputs the torque to the main shaft, and the pilot rotor exceeded by the main rotor loses the driving effect on the main shaft.

4. The compound rotor system of WECS according to claim 1, wherein the main rotor unit includes blades with the angle of attack smaller than 18 degrees; and the pilot rotor is composed of at least 4 blades.

5. The compound rotor system of WECS according to claim 1, wherein the two clutches are a ratchet-type overrunning clutch.

6. The compound rotor system of WECS according to claim 1, wherein the two clutches are a friction-type overrunning clutch.

7. The compound rotor system of WECS according to claim 1, wherein the main rotor is always located at up-wind part of the pilot rotor to receive wind first.

8. The compound rotor system of WECS according to claim 7, wherein the main rotor and the pilot rotor are both located at one and the same end of a generator.

9. The compound rotor system of WECS according to claim 7, wherein the main shaft of the compound rotor system runs through the axes of the generator, making the main rotor and the pilot rotor located at front and rear ends of the generator, respectively.

10. A compound rotor wind energy conversion system (WECS) to rotate a generator under both low speed and high speed wind conditions, comprising:
a main rotor unit with a plurality of main rotor blades;
a main rotor clutch;
a pilot rotor unit with a plurality of pilot rotor blades;
a pilot rotor clutch; and
a main shaft of the generator;
wherein the pilot rotor unit is mounted on the main shaft via the pilot rotor clutch, and the main rotor unit is mounted on the main shaft via the main rotor clutch.

11. The compound rotor wind energy conversion system (WECS) to rotate a generator under both low speed and high speed wind conditions of claim 10, wherein the plurality of pilot rotor blades has more blades than the plurality of main rotor blades.

12. The compound rotor wind energy conversion system (WECS) to rotate a generator under both low speed and high speed wind conditions of claim 10, wherein each of the plurality of main rotor blades has a predetermined angle of engagement of less than eighteen degrees.

13. The compound rotor wind energy conversion system (WECS) to rotate a generator under both low speed and high speed wind conditions of claim 10, wherein one of the pilot rotor clutch and the main rotor clutch is one of a friction type overrunning clutch and a ratchet type overrunning clutch.

14. The compound rotor wind energy conversion system (WECS) to rotate a generator under both low speed and high speed wind conditions of claim 10, wherein when an angular velocity of the pilot rotor unit is greater than an angular velocity of the main rotor unit, the pilot rotor clutch is engaged to the main shaft and the main rotor clutch is disengaged from the main shaft.

15. The compound rotor wind energy conversion system (WECS) to rotate a generator under both low speed and high speed wind conditions of claim 10, wherein when an angular velocity of the pilot rotor unit is equivalent to an angular velocity of the main rotor unit, where both the pilot rotor clutch and the main rotor clutch could be in either an engaged state or disengaged state with the main shaft, both the pilot rotor clutch and the main rotor clutch are set to engage the main shaft.

16. The compound rotor wind energy conversion system (WECS) to rotate a generator under both low speed and high speed wind conditions of claim 10, wherein when an angular velocity of the pilot rotor unit is less than an angular velocity of the main rotor unit, the pilot rotor clutch is disengaged from the main shaft and the main rotor clutch is engaged to the main shaft.

17. The compound rotor wind energy conversion system (WECS) to rotate a generator under both low speed and high speed wind conditions of claim 10, wherein the main rotor unit is located upstream ahead of the pilot rotor unit.

18. The compound rotor wind energy conversion system (WECS) to rotate a generator under both low speed and high speed wind conditions of claim 10, wherein the generator is located in-between the pilot rotor unit and the main rotor unit.

19. The compound rotor wind energy conversion system (WECS) to rotate a generator under both low speed and high speed wind conditions of claim 10, wherein the pilot rotor unit and the main rotor unit are both located on one of an upstream end and a downstream end of the generator.

* * * * *